United States Patent [19]

Seitz

[11] Patent Number: 5,216,743

[45] Date of Patent: Jun. 1, 1993

[54] THERMO-PLASTIC HEAT EXCHANGER

[76] Inventor: David E. Seitz, 4140 Directors Row, Suite F, Houston, Tex. 77092

[21] Appl. No.: 521,541

[22] Filed: May 10, 1990

[51] Int. Cl.$^5$ .............................................. F24H 1/10
[52] U.S. Cl. .................................. 392/490; 392/486; 219/497; 73/204.16; 73/204.23
[58] Field of Search ........ 392/490, 488, 489, 485-487; 219/497, 505; 73/204.15, 204.16, 204.23; 340/606; 364/510

[56] References Cited

U.S. PATENT DOCUMENTS

| | | | |
|---|---|---|---|
| 1,322,897 | 11/1919 | Gray | 165/168 |
| 3,196,679 | 7/1965 | Howland | 340/606 |
| 3,280,299 | 10/1966 | Doniak | 392/490 |
| 3,660,987 | 5/1972 | Gail et al. | 165/45 |
| 3,680,377 | 8/1972 | Lightner | 73/204.16 |
| 3,942,378 | 3/1976 | Olmstead | 73/204.16 |
| 4,185,187 | 1/1980 | Rogers | 392/489 |
| 4,436,983 | 3/1984 | Solobay | 392/489 |
| 4,455,475 | 6/1984 | Giorgetti | 392/487 |
| 4,480,467 | 11/1984 | Harter et al. | 340/606 |
| 4,502,164 | 3/1985 | Gemmell | 4/191 |
| 4,538,673 | 9/1985 | Partin et al. | 165/45 |
| 4,825,043 | 4/1989 | Knauss | 219/441 |
| 4,900,896 | 2/1990 | Maus | 392/489 |

FOREIGN PATENT DOCUMENTS 1098077  1/1968  United Kingdom ............. 73/204.23

Primary Examiner—Bruce A. Reynolds
Assistant Examiner—John A. Jeffery
Attorney, Agent, or Firm—Browning, Bushman, Anderson & Brookhart

[57] ABSTRACT

The present invention provides a flow-through instantaneous fluid heater system designed to satisfy the need for a heater not limited by being connected to a storage tank and which can be made using a plastic casing, incorporating cool-down when out of service and with features of venting and simplified flushing and draining. The system incorporates the use of one or more compartments, usually assembled in two compartment modules connected in series. Each compartment includes a casing having a hollow cylindrical interior region. An inlet aperture is located at one end of the casing and an outlet aperture is located at the other end of the casing. The lower end of each casing is closed by a removable base and the upper end of the casing is closed by a top plate and a heating element. The heating element is positioned axially in the interior region of the compartment. The heating element is activated by a control system which senses and compares temperatures of the water at the compartment outlets. The control system uses temperature comparisons to detect flow through the system to determine whether the heating elements should be activated to maintain the fluid at a stand-by temperature or at an operational temperature.

9 Claims, 5 Drawing Sheets

THERMO-PLASTIC HEAT EXCHANGER

FIELD OF THE INVENTION

The present invention generally relates to a flow-through heating apparatus for the instantaneous heating of fluids, i.e., water, and, more particularly, is concerned with a self-insulating, easy to install thermo-plastic heat exchanger of expandable modular construction for heating water without the use of a storage tank.

The typical hot water heater which has been in use for several decades now is a storage tank heater which is made of metal. These heaters have several disadvantages including a limitation upon the amount of hot water which can be stored and therefore used at a given time, energy being wasted in that the supply of water must continually be reheated, the possibility of harmful gas leaks, the potential for fires and explosions since a majority of these heaters in residential applications are gas heaters, and the heaters take up a large amount of space since a storage tank is needed. These heaters are generally located far from the point of delivery of the hot water resulting in heat loss between the storage tank and the point of delivery as well as significant loss and waste of potable water that is senselessly discharged down the drain while waiting for hot water to reach the fixture.

At the time when conventional storage tank hot water heaters became widely accepted, we did not have the benefit of the improved plastic materials now available. Engineering plastics now provide a lightweight, inexpensive alternative to metals for use in structures for handling hot water.

The need for domestic hot water is typically intermittent and of relatively short duration. State of the art design now allows for continuous flow-through type hot water heaters which only require that water be heated once and at the time of use. The advantages of an instantaneous flow-through hot water heater include savings on water heating bills, savings on potable water because of the ability to install near major points of use, increased safety through the use of electric heaters eliminating the need for gas and open flames, less space requirements since no storage tank is required, ease of maintenance, lower cost of repairs and the lifestyle benefits associated with a continuous supply of hot water. Problems resulting from corrosion of the tank can also be eliminated through the use of plastics as the material used for many of the components in the hot water heater system.

Other continuous flow water heaters have been described. U.S. Pat. No. 3,898,428 to Dye describes an inline water heating apparatus which has a cylindrical heater element surrounded by a length of helically corrugated tubing. U.S. Pat. No. 4,567,350 to Todd describes an instantaneous electric water heater which includes five water heating chambers which are connected by lengths of metal mixing pipes. The heating chambers include electrical heating elements, and a pressure relief valve is located at the bottom of the last heating chamber. U.S. Pat. No. 4,604,515 to Davidson discloses a tankless electric water heater and includes four heating chambers which are arranged as pie-like portions of a cylinder. Each chamber has a heating element and a separate temperature sensor, and one of the chambers includes a pressure relief valve. U.S. Pat. No. 4,645,907 to Salton describes an electric water heater which includes a casing with three separate heating elements.

The patents described above have several shortcomings. The patents fail to comprehend the design of a flow-through instantaneous water heater as described herein as my invention which can be constructed in series from any desirable number of flow-through instantaneous water heating compartments, usually assembled as a series of two-compartment modules, to meet the hot water output requirements of the user's application. These patents also fail to recognize the advantages of the invention that the hot water heater compartments can be constructed from plastic, that the compartments should and can be constructed for ease of draining and cleaning for maintenance purposes and removal of particulate matter which can clog the system, to construct with off the shelf type components easily obtainable for installation and replacement, the importance of the capability to determine the temperature at the outlet of each compartment, the importance of venting entrapped air or gas from the upper end of each and every separate compartment used in the hot water heating system during normal operations as opposed to using pressure relief valves and in only some of the compartments, solving problems associated with overtemperature conditions due to inaccuracies from reading the temperature of the fluid at the very top of the compartment where steam can collect if gases are not vented and the importance of incorporating, optionally, an electronic control system into the operation of the heating system for detecting water level and for electronically detecting flow (without moving parts) in order to determine if the system is in an operational or a stand-by state, and for sequentially modulating the heating elements in consecutive compartments in order to achieve a desirable output temperature from the system which will shut off the heating elements when temperatures within the compartments reach excessive levels.

Consequently, a need exists for significant improvements in complete flow-through instantaneous water heating systems with the objective of solving all of the above-mentioned disadvantages.

SUMMARY OF THE INVENTION

The present invention provides a flow-through instantaneous fluid heater system designed to satisfy the aforementioned needs. The system incorporates the use of one or more compartments, usually assembled in two compartment modules connected in series. Each compartment includes a casing having a hollow cylindrical interior region. An inlet aperture is located at one end of the casing and an outlet aperture is located at the other end of the casing. The lower end of each casing is closed by a removable base and the upper end of the casing is closed by a top plate and a heating element. The heating element is positioned axially in the interior region of the compartment. The heating element is activated by a control system which senses and compares temperatures of the water at the compartment outlets. The control system uses temperature comparisons to detect flow through the system to determine whether the heating elements should be activated to maintain the fluid at a stand-by temperature or at an operational temperature.

DETAILED DESCRIPTION OF THE INVENTION

Figure 1:
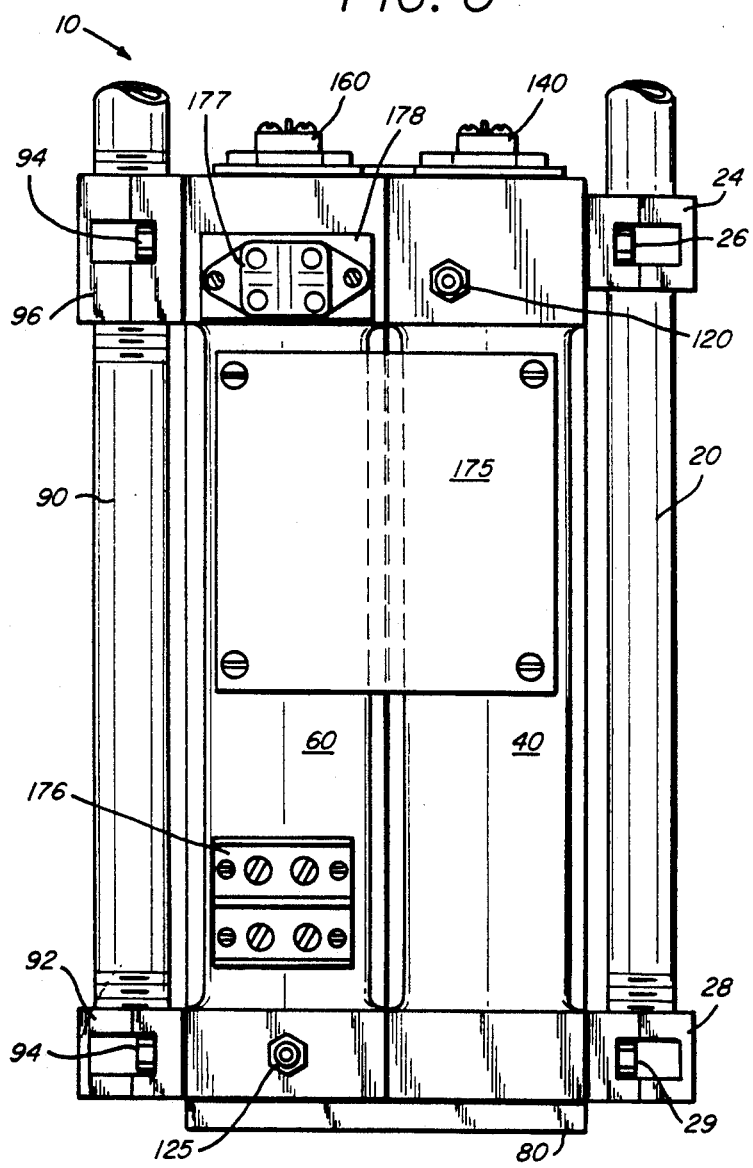
FIG. 1 is an elevational view of a two compartment flow-through heating apparatus representing a single module of the water heater.

Referring now to the drawings, and more particularly, to FIG. 1, there is shown one embodiment of the flow-through heating apparatus and system, generally designated 10, for the instantaneous heating of a fluid, preferably a liquid, such as, for example, water. For purposes of discussion of the embodiments of this invention, the heater will be discussed as if it is a water heater, the most common use for it. The instantaneous water heater 10 generally incorporates a few basic conduit elements joined in series, namely an inlet pipe 20 at the upstream end of the system 10, a first compartment 40, a second compartment 60 and a discharge pipe 90 at the downstream end of the system 10. The first compartment 40 and second compartment 60 contain heating elements 140 and 160, respectively, for the instantaneous heating of water as it passes through. For purposes of this invention two compartments will be considered to be a module for simple expansion purposes where needed.

Figure 3:
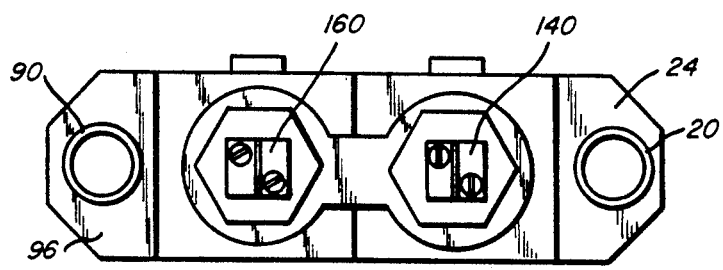
FIG. 3 is a top view of a two compartment flow-through heating apparatus.
Figure 2:
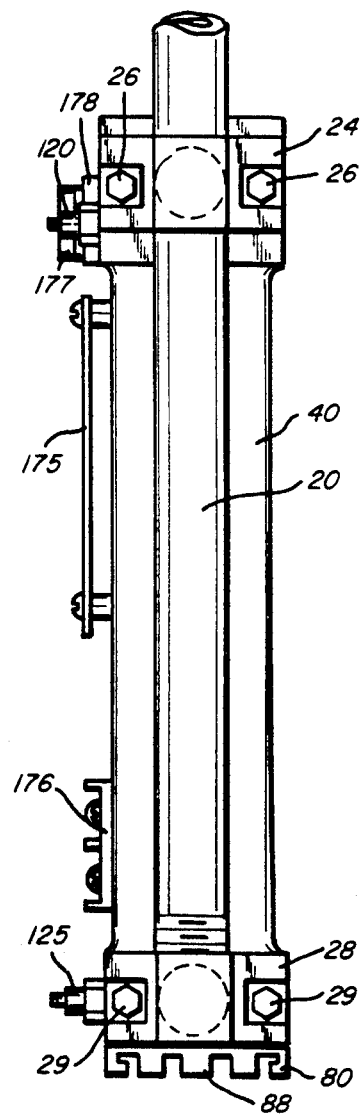
FIG. 2 is a side view of a two compartment flow-through heating apparatus.

As shown in FIGS. 1, 2 and 3, inlet pipe 20 is supported by an inlet pipe support 24. The inlet pipe support 24 includes O-ring groove 27, (FIG. 4), fits around the outer circumference of inlet pipe 20, and is attached to first compartment 40 by bolts 26. The lower end of inlet pipe 20 is threaded for connection to inlet fitting 28. Inlet fitting 28 is attached to the lower side proximate the lower end of first compartment 40 by bolts 29

Figure 5:
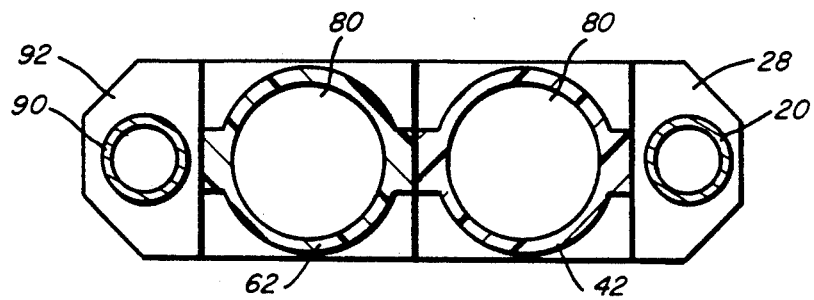
FIG. 5 is a cross-sectional view of a two compartment flow-through heating apparatus taken along the line 5—5 of FIG. 4.
Figure 4:
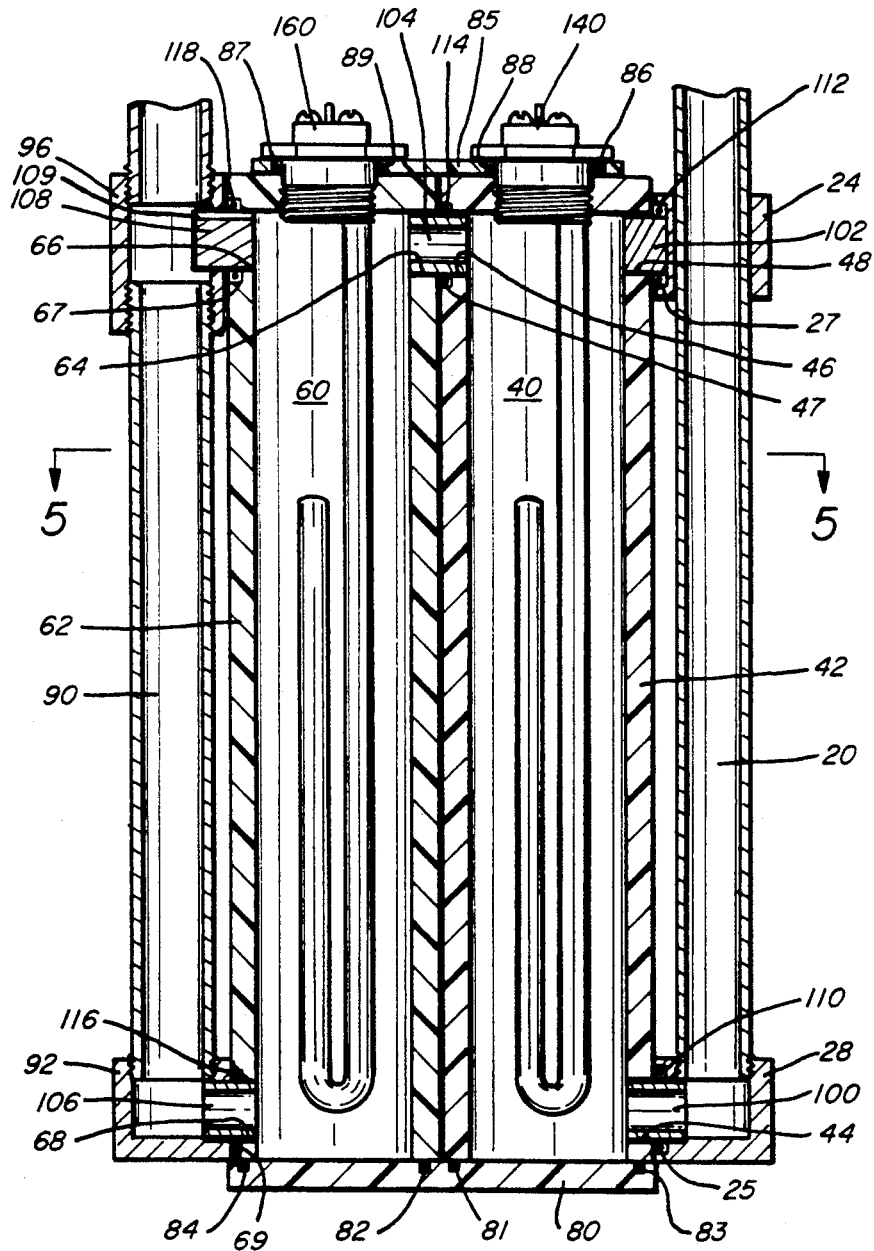
FIG. 4 is a cross-sectional view of a two compartment flow-through heating apparatus shown in FIG. 1.

Sectioned drawings, FIGS. 4 and 5, show a first compartment 40, surrounded by a casing 42, as being a hollow, cylindrical interior region. Casing 42 is shown as being tubular, though not necessarily so, having a first aperture 44 located proximate the lower end and a second aperture 46 located proximate the upper end of casing 42. A third aperture 48 is optional to simplify the plastic molding process for modularity of compartments and if included is located proximate the upper end of casing 42 opposite second aperture 46. A connector 100, which is tubular in construction is used to connect inlet fitting 28 to first compartment 40 through the first aperture 44 to allow fluid communication from the inlet pipe 20 with first compartment 40. An O-ring 110 is seated in groove 25 in inlet fitting 28 in order to provide an effective seal between inlet fitting 28, connector 100 and first compartment casing 42.

As shown, third aperture 48 in first compartment 40 is closed by plug 102 and sealed using an O-ring 112 seated in groove 27. Plug 102 is cylindrical and solid.

Second aperture 46 is used for connecting the flow path of the water through the first compartment 40 to the second compartment 60. Connector 104 is used for making this connection between first compartment 40 and second compartment 60 and is positioned adjacent the top of first compartment 90. Connector 104 is the same as connector 100 and is mounted in second aperture 46 of first compartment 40 and in first aperture 64 of second compartment 60 and is sealed by O-ring 114 seated in groove 47 in first compartment 40.

Second compartment 60 is the same as or similar to first compartment 40. Second compartment 60 is a cylindrical longitudinal cavity in casing 62 having first aperture 64 and second aperture 66 proximate the upper end and third aperture 68 located proximate the lower end.

Both the first compartment 40 and second compartment 60 are closed at the lower end by a base 80 which is attached by bolts or other suitable means of attachment. Preferably, O-rings 81 and 82 will be placed in grooves 83 and 84 in base 80, respectively, in order to seal the lower end of the compartments 40 and 60. The base 80 is readily detachable and reattachable to allow for cleaning of corrosion and other particulate matter from the compartments 40 and 60 and heating elements 140 and 160 without removing electrical wiring. The casings 42 and 62 or base 80 could also be tapered and constructed with a valve for each compartment 40 and 60 to allow pneumatic or some other type of blow down without removal of base 80. It is to be understood that the base 80, while shown as a single piece closing both compartments 40 and 60, it could be manufactured as two separate pieces, one each to be connected to the bottom end of first compartment 40 and second compartment 60. As shown in FIG. 2, the lower end 88 of base 80 is preferably webbed to provide structural strength while saving on material costs.

Top plate 85 preferably provides an electrical ground means for the heating elements and is held against heating elements 140 and 160 when heating elements 140 and 160 are threaded or attached by other suitable means of attachment to casing 42 and 62. Though plate 85 is shown as a single plate, it is to be understood that top plate 85 could also be manufactured as two separate plates, one each to be attached to the tops of casing 42 and 62. Top plate 85 is preferably a grounding plate to be connected to any suitable grounding surface for grounding heaters 140 and 160.

As shown in FIG. 4, heating element 140 extends down through the opening in top plate 85 and extends axially through the interior region of first compartment 40. Heating element 140 extends downward in an axial direction into the hollow interior region of first compartment 40. The axial location of the heating element 140 within the hollow interior region is such that the heating element 140 is substantially equidistant from casing 42 at any point around the circumference of casing 42. The heating element 140 is seated on top plate 85 and preferably is attached to compartment 40 through a mating threaded connection. O-ring 86 is placed in groove 88 between heating element 140 and top plate 85 for sealing off the top end of first compartment 40. A preferable heating element for water is sized between 3500 and 7000 watts output based on the design rating of the specific heater. The uniformity of the heat transfer from the heating element 140 to the water flowing through first compartment 40 is enhanced due to the substantially symmetrical location of the element 140 with respect to the hollow cavity through which the fluid, water, will flow.

Heating element 160 extends down through the opening in top plate 85 and axially into the second compartment 60. Heating element 160 is the same as or similar to heating element 140. Heating element 160 is seated on top plate 85 and preferably is attached to compartment 60 through a mating threaded connection. O-ring 87 is placed in groove 89 between heating element 160 and top plate 85 for sealing off the top end of second compartment 60.

A temperature sensor or thermistor 120 (FIG. 7) protrudes into the interior region of first compartment casing 42 proximate the second aperture 46 for sensing the temperature T1 of the water flowing out of first compartment 40. Sensor 120 may protrude within the compartment casing 42 from other positions so long as it is in the flow path of the water and proximate the second aperture. For purposes of this invention any water downstream from the first heating element 140 and upstream from second aperture 46 can be considered to be proximate the second aperture 46.

A temperature sensor or thermistor 125 protrudes into the interior region of second compartment casing 62 proximate the third aperture 68 for sensing the temperature T2 of the water flowing out of second compartment 60. Sensor 125 may protrude within the compartment casing 62 from other positions so long as it is in the flow path of the water and proximate the third aperture 68. For purposes of this invention, any water downstream from the second heating element 160 and upstream from third aperture 68 can be said to be proximate the third aperture 68.

Discharge pipe 90 is connected to second compartment 60 through discharge fitting 92 and bleeder fitting 96. Connector 106 is used for connecting second compartment 60 to discharge fitting 92 and is sealed by O-ring 116 which seats in groove 69 in casing 62. Discharge fitting 92 is attached to second compartment 60 by bolts 94. Discharge fitting 92 and bleeder fitting 96 may be threaded or attached by other suitable means to pipe 90, or may be prefabricated as part of pipe 90.

Figure 6:
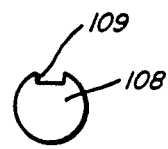
FIG. 6 is an end view of the vent plug.

Fitting 96 is attached to second compartment 60 by bolts 94. Vent plug 108 is mounted in second aperture 66 of second compartment 60 and vents air, steam and other gases into fitting 96 and from there into outlet pipe 90. Vent plug 108 is partially sealed within second aperture 66 by O-ring 118 which is seated in groove 67 in casing 62. As seen in FIG. 6, vent plug 108 has a first channel 109 preferably positioned adjacent to the top of second compartment 60. Channel 109 in vent plug 108 allows gases during normal operating conditions in first compartment 40 and second compartment 60 to be separated from the liquid and released into discharge pipe 90 and out of the system without requiring pressure to be built up before such gases are released. Channel 109 is large enough to allow the vapors to escape but small enough to prevent any appreciable liquid bypass. Of course as an alternative to aperture 66, plug 108 and vent 109, the casing could be cast without such aperture and a small vent hole could be drilled to allow passage of gases into fitting 96 and outlet pipe 90.

Water flowing through inlet pipe 20 will enter the lower end of first compartment 40 and be heated by heater element 140 as the water rises within first compartment 40. The water will then flow-through connector 104 and down through second compartment 60 as it is heated by heater element 160. The water then reaches the lower end of second compartment 60 and is discharged through discharge fitting 92 and out discharge pipe 90, which may be fabricated as a single piece if desired. Any gases which may build up in the system through the interaction of heaters 140 and 160 with the water will automatically rise to the top of first compartment 40 and second compartment 60 because of the lower density of the gases.

As shown in FIGS. 4 and 6, connector 104 and vent channel 109 located in vent plug 108 creates an outlet for these gases through discharge pipe 90 so that heating elements 140 and 160 will remain submerged at all times and so that temperature sensor 120 will sense a fluid temperature and not vapors. Water flowing through vent channel 109 in vent plug 108 will be limited because of the decreased area of vent channel 109.

It is to be understood that all attachments made by bolts may be made by other suitable attachment means such as adhesive or sonic welding, for example, and that inlet pipe 20, inlet fitting 28, discharge fitting 92 and bleeder fitting 108 may each or all be made as pieces threadable or otherwise attachable to pipes 20 and 90 or as features manufactured into the pipes 20 and 90. It is also to be understood that compartments 40 and 60 could be prefabricated as one piece which eliminates the need for connectors and O-rings between the two compartments although connection could still be made to additional compartments added on to the two compartments.

Figure 7:
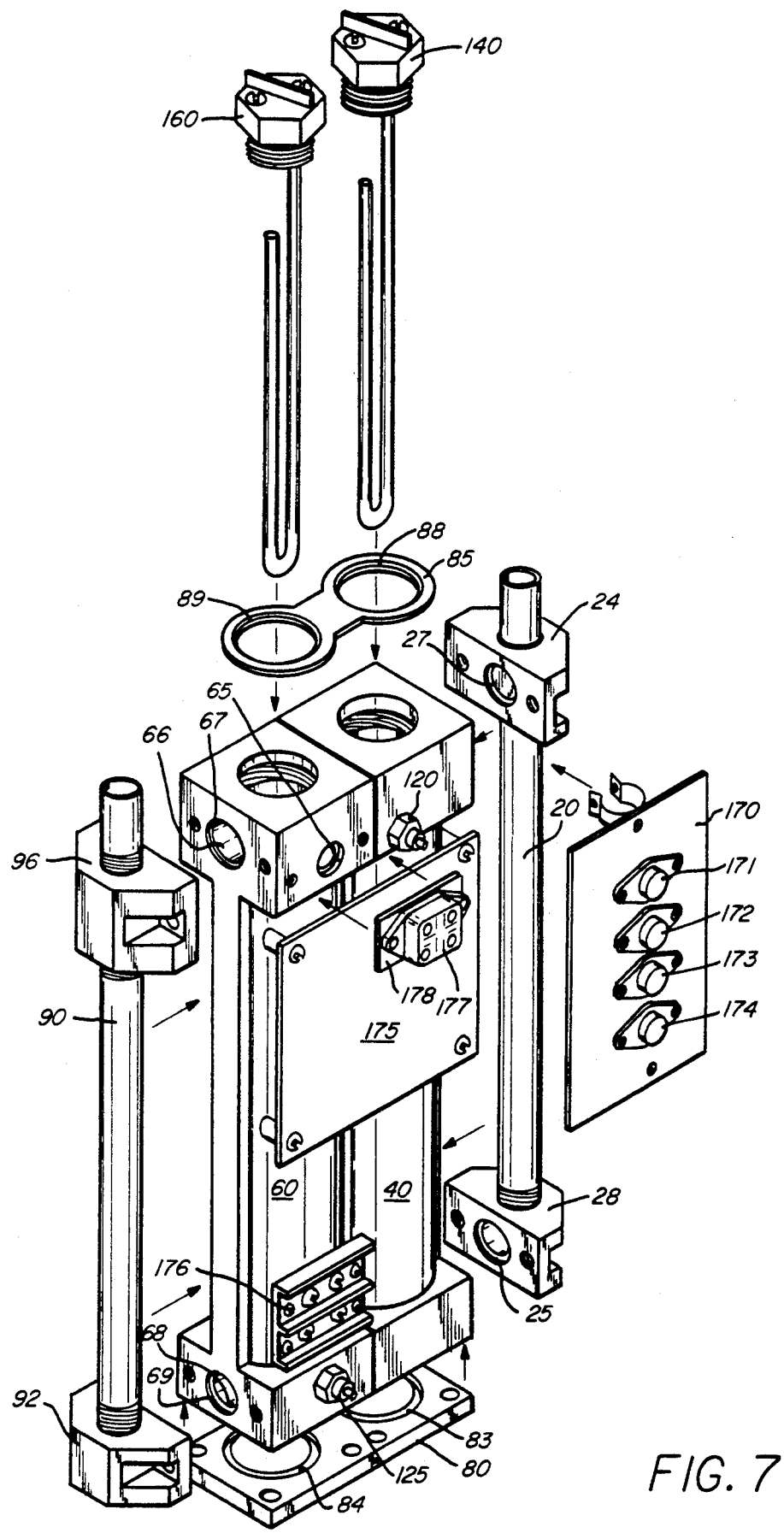
FIG. 7 is an exploded perspective view of the invention described herein incorporating two compartments.

Referring now to FIG. 7, a more detailed view of the flow-through heating apparatus 10 shown in FIGS. 1-6 is shown. Triac heat sink 170 is to be mounted on inlet pipe 20. Screw mounted triacs 171, 172, 173 and 174 are mounted on heat sink 170. High limit thermostatic cut-off switch 177 and grounding plate 178 are to be connected over aperture 65 located in the upper end of second compartment 60. High limit switch 177 senses excess temperature within the heating apparatus 10 and cuts-off heaters 140 and 160 when such overtemperature conditions are sensed. An optional control board mounting plate 175 is shown connected to first compartment 40 and second compartment 60 and electric input terminal 176 is shown connected to second compartment 60. These terminals may be placed at any suitable location and are shown as described above merely for illustration.

Figure 8:
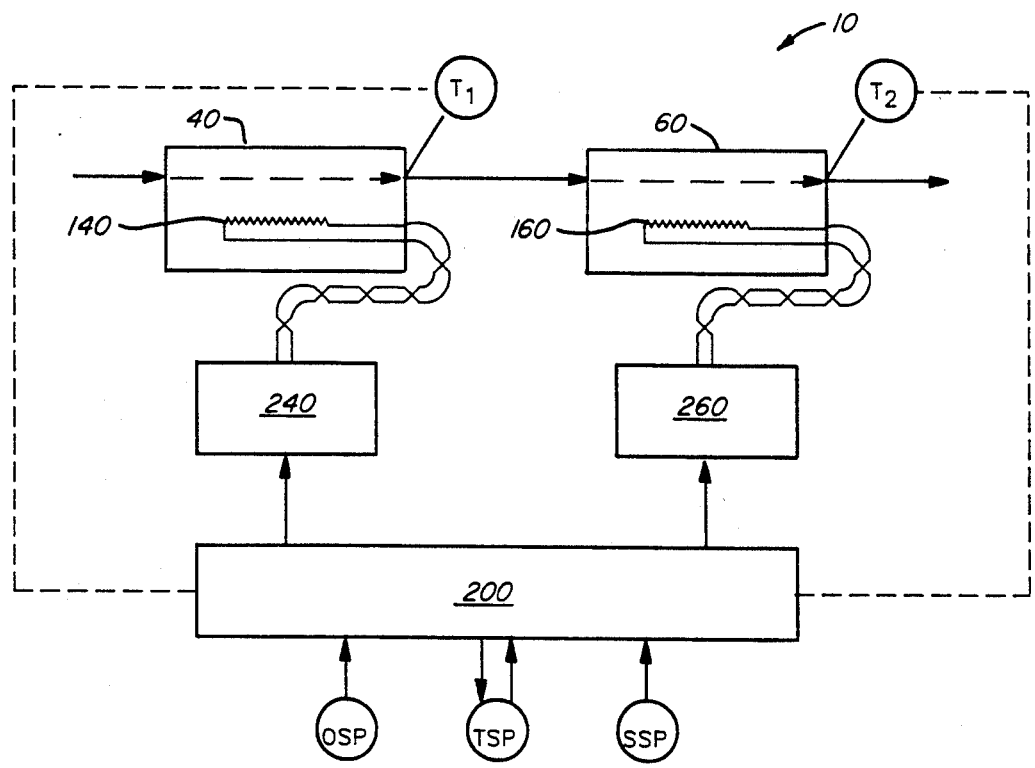
FIG. 8 is a functional block diagram of the control system of the invention described herein.

FIG. 8 illustrates a two compartment fluid heating apparatus 10 for fluids, such as water, and includes first compartment 40 and second compartment 60. Fluid enters compartment 40 where it is heated. The fluid leaves compartment 40 and then enters compartment 60 where it may also be heated. The fluid then exits from compartment 60. The temperature of the fluid leaving compartment 40 is identified as temperature T1 and the temperature of the fluid exiting compartment 60 is identified as temperature T2.

The design of control system 200 as described below illustrates a preferred control system design. Once given the control system concepts such design would be known to one of ordinary skill in the art for carrying out a preferred mode of the invention. Other control system designs known to one of ordinary skill in the art could also be used.

The control system logic 200 is shown and may include an optional water level permissive which enables the control function whenever sufficient water level is detected in the heating compartments using conductivity measurement means. Also it is shown to have an operating set point OSP, a transitional set point TSP and a stand-by set point SSP which controls when the heater is at rest. The stand-by set point SSP serves to prevent stand-by heating losses and to prevent the heating apparatus 10 from freezing when in a stand-by mode in a freezing location. The transitional set point TSP is the actual target temperature provided to the heating apparatus 10 by the logic 200. It is a set point derived from operating set point OSP. The operating set point OSP is the selected temperature for hot fluid leaving the instantaneous flow-through heating apparatus 10 when the heating apparatus 10 is functioning. The transitional set point TSP is also derived from stand-by set point SSP. Stand-by set point SSP represents a lower set point than the operating set point OSP while transitional set point TSP is a value between SSP and OSP and preferably floats above the incoming temperature of the fluid and the freeze point of the fluid. The stand-by set point SSP functions to allow the fluid heating apparatus 10 to cool down, use less power and have lower heat losses when in a non-flow or stand-by mode. The operating set point OSP, stand-by set point SSP, temperature T1 and temperature T2 are all inputs to control system logic 200. The transitional set point TSP is internally generated within the control system logic 200. The output of control system logic 200 is first heater drive 240 and second heater drive 260. Heater drive 240 provides energy to heater 140 which is located in compartment 40 and heater drive 260 provides energy to heater 160 which is located in compartment 60.

As previously discussed, the logic 200 as shown permits a time delayed transition between the operating set point OSP and stand by set point SSP which is known as transitional set point TSP. If the designer chooses, the transition time can be established as instantaneous, in which case the transition set point TSP becomes equal to either operating set point OSP or slightly higher than the stand by set point SSP based upon whether there is flow through the heating apparatus 10 as determined by the relationship between temperature T1 and temperature T2. With slight modification one skilled in the art can eliminate the sophistication of TSP and design the units logic to operate at either OSP and SSP based on the existance of flow which is determined by the relationship between T1 and T2. A designer can likewise choose transition set point TSP to be a floating value determined by a fixed number added to temperature T1 or subtracted from temperature T2. Thus (depending upon whether flow is detected by the relationship between temperatures T1 and T2) the transitional set point TSP (regardless of whether it is instantaneous or floating) is modified to a design chosen dead band range around operating or stand-by condition. Typical values for a domestic home water heater might be an operating set point OSP of 145° Fahrenheit and a standby set point SSP of 40° Fahrenheit or some other value above the freezing point of the fluid being conducted through the heater 10.

Figure 9:
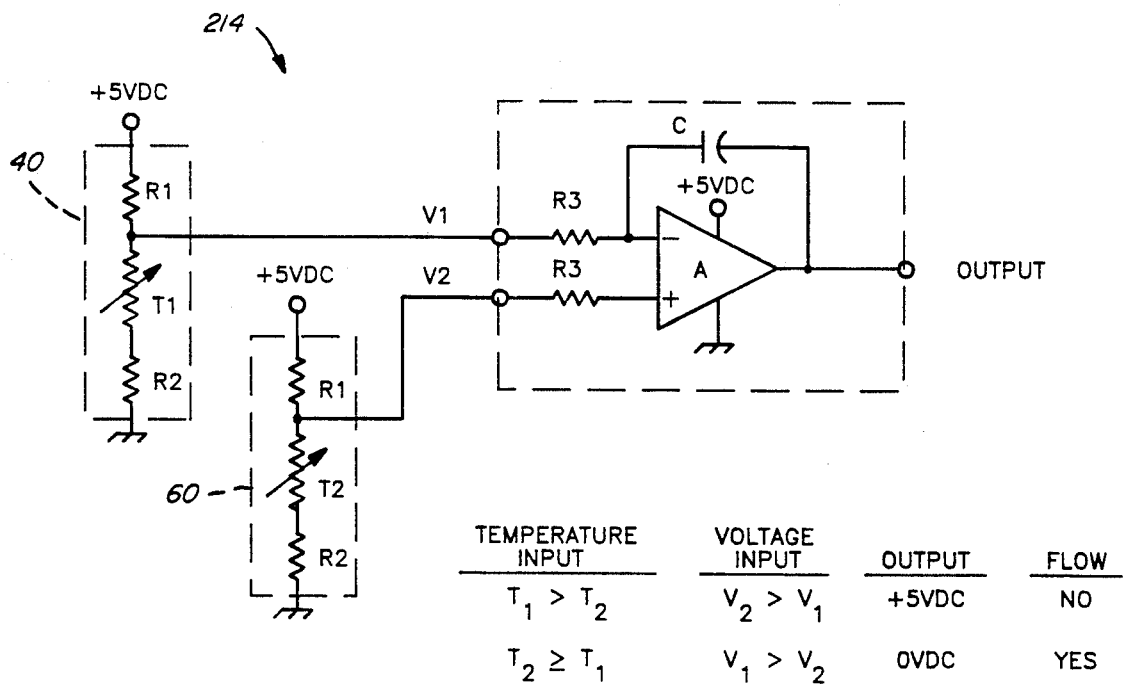
FIG. 9 is a schematic of the flow detection device incorporated alternately in the herein described invention.
Figure 10:
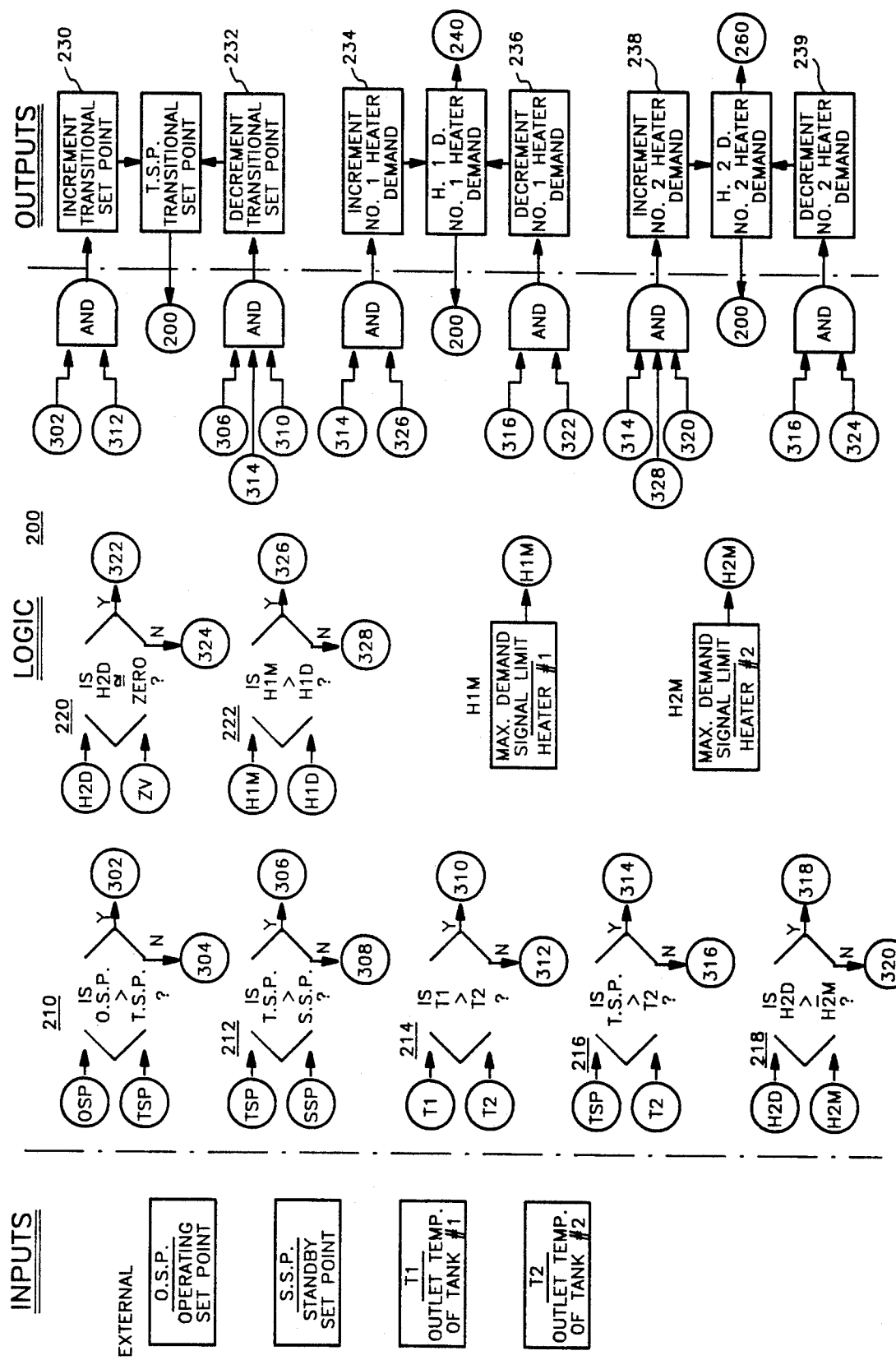
FIG. 10 is a functional block diagram of the control logic in accordance with this invention.

Now referring to FIG. 9, an example of logic switch implementation for FIG. 10, there is shown a schematic diagram for the flow switch circuit, generally designated 214, which is an analog switch which differentiates between two analog inputs and yields an output representing a logic 1 or a logic 0 based upon which of the two inputs is higher. These circuits are well known to those skilled in the art and function as switches throughout the control system of this embodiment.

The circuit 214 entails two input voltages V1 and V2 which respectively represent the compartment outlet temperatures of the first compartment 40 and the second compartment 60 through current limiting resistors R3 into an operational amplifier A which has a tie back capacitor C to the inverting input. Typical components and/or values for such components shown in FIG. 9 would be as follows: Thermistors T1 and T2, General Automotive Specialties number 25502; resistors R1, approximately 800 to 1200 ohms; resistors R2, 0 ohms when using General Automotive number 25502 (the case of the thermistor is grounded and R2 is automatically 0). Resistors R3 serve only a current limiting function and may be any value between 1,000 ohms and 100,000 ohms; the tie back capacitor C is typically between 0.1 to 0.4 microfarads; the operational amplifier A would typically be ¼ of a Motorola integrated circuit number MC3403P. Others may be used, of course, but the foregoing components may be used with satisfactory results.

The internal logic 200 for controlling the flow-through heating apparatus 10 is unique because it incorporates flow detection without requiring a conventional flow switch. The electronic flow detection is based on the following principle: First heater 140 will maintain temperature T1 higher than temperature T2 during a stand-by mode when there is no flow through the heating apparatus 10; when flow begins the warmer water from compartment 40 is forced into compartment 60 causing T2 to become equal or nearly equal to T1 thereby indicating flow; and when the heaters 140 and 160 for the fluid are activated or heated sequentially in such a manner that heater 140 is activated sequentially ahead of heater 160 when flow starts and are deactivated sequentially in such a manner that heater 160 shuts down sequentially ahead of the shutdown of heater 140 when flow stops, then flow detection can be based on the relationship between two separate locations or chamber such as temperature T1 in compartment 40 and temperature T2 in compartment 60. Given the flow detection concept, one skilled in the art could design the flow detection method to operate based on the temperature relationship between any two locations within the heater, such as the temperature relationship between the incoming fluid supply 20 to the fluid in compartment 40. For flow detection one temperature sensor must be located downstream from another and a heating means must be positioned such that a temperature differential is maintained between the sensors when there is no fluid flow. This invention controls the activation of the heaters 140 and 160 based on the flow detection principle and, because such flow detection is done without mechanical moving parts, such detection is quite reliable and effective. For operation, the flow switch 214 only requires that heat be applied in the first compartment 40 and then only enough to maintain the temperature at or above the standby set point SSP.

The control system uses the temperature sensor 120 located in the first compartment 40 to measure a value for T1 and the temperature sensor 125 located in the second compartment 60 to measure a value for T2 the difference between the temperatures of the two compartments is used to detect flow. When there is no fluid flow, heat is first added to the fluid in the first compartment 40 through the first heating element 140 in order to maintain the fluid in the first compartment 40 at or above the stand-by set point temperature SSP. In this state, the temperature T1 in the first compartment 40 will be higher than the temperature T2 in the second compartment 60. In a situation where there is no flow and where temperature T1 drifts in such a manner that it approaches T2 and flow is indicated by output signal 312 such a condition lasts only momentarily because the following sequence of events occurs. As seen in FIG. 10, TSP is incremented by output signals 302 and 312; heater No. 1 is incremented by signals 314 and 326, temperature T1 increases quickly because there is no flow; T1 becomes higher than T2 which restores the "no flow" signal 310; TSP is decremented by output signals 306, 310, and 314; heater No. 1 demand is decremented by output signals 316 and 322; and the "no flow" stand-by state is restored.

When the fluid begins to flow, even though heat will be added, the temperature T1 in the first compartment 40 will fall below the temperature T2 in the second compartment 60 and by comparing these two temperatures T1 and T2, or the temperature differential, the control system determines that there is flow through the system. When the control system detects flow the set point normally changes from an idle or transitional set point TSP to an operating set point OSP as described below and shown in FIG. 10. The operating set point OSP is generally equal to the desired output temperature of the system.

When fluid stops flowing or flows at very low rates through the system the temperature sensed in the first and second compartments 40 and 60 will begin to equalize and when flow stops the temperature T1 in the first compartment 40 will exceed the temperature T2 in the second compartment 60. The control logic 200, by comparing the temperature differential or by registering a low first heater demand H1D, will determine that there is a "no flow" state and the furthest downstream heating element which is activated will be decremented until it is deactivated at which time, if required, the adjacent heating element will be decremented so that the fluid temperature will be changed from operating set point OSP to a transitional set point TSP, approaching stand-by set point SSP, between operational set point OSP and stand-by set point SSP to reduce stand-by losses in energy.

The stand-by set point temperature SSP may be a floating set point temperature or a fixed point temperature as well. A preferable floating stand-by set point temperature SSP will float to remain at a margin of 8° or 10° Fahrenheit above the inlet temperature to the water heater system 10 but it should always be maintained at the margin selected above the freezing temperature of the fluid.

Logic element 214, as described, is comparable to each of the other logic elements shown in FIG. 10, these being logic elements 210, 212, 216, 218, 220 and 222.

Where appropriate, the control system will include electrical conductivity to detect an acceptable water level in the compartments as a permissive for the application of power to the control system logic. An electrical contact pair (not shown) is located proximate to thermistors 120 and 125 for detecting the presence of a full compartment of water through conductivity means as an optional permissive to operation of the heating apparatus 10.

FIG. 10 outlines the design logic for a two chamber heating apparatus 10 using temperature derived electronic flow detection, it being understood that such control logic system 200 is applicable for any pair of a series of chambers greater than two, which may be assembled together. On the left side of FIG. 10 are the four inputs to the control system logic 200, namely, operating set point OSP, stand-by set point SSP, outlet temperature T1 of first compartment 40, and outlet temperature T2 of compartment 60.

The logic required to operate the two compartment 40 and 60, two heater element 140 and 160, heating apparatus 10 consists of seven analog logic switches 210, 212, 214, 216, 218, 220 and 222, two maximum demand limit set points H1M and H2M one each for first heater 140 and second heater 160; six logic "AND" gates are required to complete the logic; three additional inputs to the logic are generated from the outputs: These are transitional set point TSP, first heater demand H1D and second heater demand H2D.

There are six outputs from heater control logic 200. The first output 230 functions to increment the transitional set point TSP and the second output 232 functions to decrement the transitional set point TSP.

The third output 234 of the heater logic 200 is to increment the demand of the first heater 140 and the fourth output 236 is to decrement the demand of the first heater 140. These two outputs 234 and 236 go to first heater demand H1D which is also provided as a signal back into logic 200.

The fifth output 238 of the heater logic 200 is to increment the demand of the second heater 160 and the sixth output 239 is to decrement the demand of the second heater 160. These two outputs 238 and 239 go to second heater demand H2D which is also provided as a signal back into logic 200.

The functioning of internal logic 200 shown in FIG. 10 is described as follows. As shown, the conditions required to increment the transitional set point TSP are a yes output 302 from logic 210 and a no output 312 from logic 214. This output, 230, is used to increment the transitional set point TSP above the stand-by set point SSP but no higher than the operating set point OSP. The conditions required for output signal 232 to decrement the transitional set point TSP are a yes output 306 from logic 212, a yes output 310 from logic gate 214 and preferably also includes a yes output 314 from logic gate 216. Yes output 306 results when the transitional set point TSP is greater than the stand-by set point SSP. Yes output 310 results when temperature T1 is greater than temperature T2. Yes output 314 results when the transitional set point TSP is greater than temperature T2 which limits the transitional set point TSP to tracking temperature T2 during cool down when the heating apparatus 10 is in a stand-by state.

First heater demand H1D is controlled by increment output signal 234 and decrement output signal 236 provided through logic "AND" gates. The conditions required to increment signal 234 the first heater demand H1D are a yes outputs 314 and 326, respectively from logic gates 216 and 222. These conditions are met in logic gate 216 when transition set point TSP is greater than temperature T2 and are met in logic gate 222 when first heater maximum demand limit H1M is greater than first heater demand H1D. Thus, the transitional set point TSP is calling for more heat and the first heater maximum HIM limit has not been reached.

The conditions required to decrement signal 236 the first heater demand H1D are a no output 316 from analog logic switch gate 216 and a yes output 322 from logic gate 220. No output 316 results when transitional set point TSP is not greater than temperature T2. Yes output 322 results in analog logic switch 220 when the second heater demand H2D is substantially equal to zero ZV which preferably results when 0.05 volts are registered although other voltage reading limits can be used. In brief, if the outlet temperature T2 exceeds the transitional set point TSP and the second heater demand H2D is substantially zero, then decrement the first heater demand H1D.

The second heater demand H2D is controlled by increment signal 238 and decrement signal 239 provided through logic "AND" gates. The conditions required to increment signal 238 the second heater demand H2D are a yes output 314 from logic gate 216, a no output 328 from logic gate 222 and a no output 320 from logic gate 218. A yes output 314 results in logic gate 216 when the transitional set point TSP is greater than temperature T2. A no output 328 results from logic gate 222 when the maximum capability of the first heater H1M is not greater than the first heater demand H1D. A no output 320 results from logic gate 218 when the second heater demand H2D is not greater than or equal to the maximum capability of the second heater H2M. In brief, if the outlet temperature T2 is less than the target temperature TSP, the demand of the first heater H1D is at maximum capability HIM and the demand of the second heater H2D is not at maximum capability H2M, then the demand on the second heater H2D should be incremented.

The conditions required to decrement signal 239 the second heater demand H2D are a no output 316 from logic gate 216 and a no output 324 from logic gate 220. A no output 316 results in logic gate 216 when the transitional set point TSP is not greater than temperature T2. A no output 324 results from logic gate 220 when the second heater demand H2D is not substantially equal to zero ZV. In brief, if the outlet temperature T2 is greater than or equal to the target temperature TSP and there is a demand on the second heater H2D, such demand on the second heater H2D should be decremented.

For simplicity, all of the above has been drawn and discussed based on a two compartment, two heater element fluid heating apparatus 10 for such fluids as domestic water. The same logic can be applied to control of a multi-element, multi-compartment heating apparatus with more than two heating elements and more than two compartments simply by incorporating all additional heating elements within the additional compartments sequentially after heating element 160 and compartment 60. The designer can adapt the invention to the output needs of the end user by incorporating the necessary control system, and number of compartments and heating elements. Thus, one skilled in the art would simply sequence each successive heater to the limit required.

Likewise, in a heating apparatus 10 having more than two compartments one would separate temperature T2 into two separate measurements. Temperature T2 represented in logic element 214 used to determine if flow exists would be sensed by temperature sensor 125 located in the second sequential compartment 40. However, temperature T2 used as the main heater control input in logic element 216 would preferably be sensed from the last sequential compartment (e.g. if there are six compartments, in the sixth compartment).

Likewise, one skilled in the art can use the inputs to analog logic switches 214 and 216 also as inputs to differential amplifiers to establish rate or acceleration/deceleration limits for a moving transitional set point TSP, first heater demand H1D and second heater demand H2D for even more precise control.

In the preferred embodiment, transitional set point TSP, first heater demand H1D and second heater demand H2D represent analog memory units operating between 0 and 5 volts d/c. Their output is converted to asynchronous pulses using a pulse width modulator such as Motorola MC34060 whose output is used to drive NOR logic drivers such as Motorola SN74LS28N which in turn drive optical isolation units such as Motorola MOC3040. The optical isolation units are directly connected to triac switches which control power to the heating elements 140 and 160. Of course equivalent components are known which can accomplish the results set forth above.

The control system uses the pulse width modulator to modulate each of the heating elements in each compartment in response to the comparison made between the set point SSP or TSP and the temperature as sensed at the outlet of each compartment. One object of the control system is to achieve a constant outlet temperature from the instantaneous water heater as determined by the user of the heater. This object is achieved by sequentially modulating the activation or "on" time of the heating element adjacent to the last sequential heating element which is fully on until the desired outlet temperature from the entire system is achieved. If the user of the system then desires to lower the outlet temperature of the system the control system will then reverse itself to sequentially modulate the deactivation of the heating elements and shut off heating elements as required to allow the outlet temperature of the fluid to lower. The acceleration of the duty cycle of modulation can be adjusted to either be an increasing, decreasing or constant rate of acceleration or deceleration depending upon the needs of the system.

When hot water is desired from the heating apparatus 10 at rest, the control system will initially begin to modulate the first heating element 140 located in the first compartment 40. The percentage "on" time of the first heating element 140 will continue to increase until either a first switching point temperature is reached (at which time the first heating element 140 goes from a high duty cycle to a fully on position) or until the desired outlet temperature from the system is reached. If the first switching point temperature is reached prior to reaching the outlet temperature, the first heating element 140 will go from a high duty cycle to a fully on position and the second heating element 160 will begin to modulate. The duty cycle of the second heating element 160 will increase once again until the desired outlet temperature is reached or until it is turned fully on. If it is turned fully on and a third sequential compartment is included, then the process will continue as described above. If only two compartments are included, the system will then be operating at maximum output capability.

An embodiment used for electronic control of electric heating elements has been described. However, the output increment and decrement signals could be provided to a stepping motor which sets a pilot valve for a gas operated heater as well. It is not the intention to limit this invention to either electric or gas heating, since either mode of heating can be applied and incorporated into the invention.

The control system utilizing the control logic 200 and flow detection device 214 of the present invention as shown in FIGS. 8, 9 and 10 preferably operates with two or more compartments although one compartment may be used as well. If only one compartment is used, the temperature must be sensed both at or proximate the inlet end and at or proximate the outlet end of such compartment.

As previously described for the two compartment embodiment the temperature sensors 120 and 125 are located proximate the outlet aperture of the first and second compartments 40 and 60. If there are more than two compartments, the preferred embodiment of this invention need only include temperature sensors in the first and second compartments and in the last sequential compartment. However, temperature sensors may be located in each and every compartment or in the inlet and/or outlet pipes as well. The control system uses these temperature sensors to detect the flow of a fluid through the system, to detect overtemperature conditions within the system, and in order to determine whether heating elements within the system should be activated in order to achieve a desired output temperature of the fluid flowing out of the system.

When there are more than two compartments, the control system can either establish an operating set point OSP for each compartment separately or can maintain an operating set point OSP for only the outlet from the entire system. The operating and stand-by set points are both adjustable or variable. The operating set point OSP may be set before the instantaneous water heater is installed or may be adjusted by the user. If temperature sensors are included in each compartment, the control system can compare the temperature reading at the outlet of each compartment as sensed by the temperature sensors to the respective set point temperatures. However, in the preferred embodiment, the control system will compare the set point temperature with the temperature reading at the outlet from the entire system as sensed by the temperature sensor in the last sequential compartment.

The control system logic 200 also includes an overtemperature shut down feature. When the sensor 125 senses that the outlet temperature T2 of the second compartment 60 (or the final compartment in a multiple compartment system) exceeds the transitional set point TSP, the control system logic 200 will determine that the first compartment 40 has reached an overtemperature and will decrement the heating elements 140 and 160. The heating elements 140 and 160 will be modulated back on again as soon as temperature T2 cools down below the transitional set point temperature TSP. The control system logic 200 incorporates an additional overtemperature shut down feature through input from high limit thermostatic cut-off switch 177 which will switch off the heating elements 140 and 160 in the event that overtemperature conditions exist due to a failure in the control logic 200, sensors 120 or 125, etc.

All of the parts used to make the flow-through heating apparatus can be made from plastic except for the electronic control and wiring; heating elements 140 and 160, the temperature sensors 120 and 125; O-rings and miscellaneous hardware. Through the use of plastics, the compartments can be made at a low cost while being non-corrodible, self-insulating, lightweight, sturdy, durable and capable of operating at temperatures above 150° Fahrenheit. High temperature thermoplastic resins can be used to satisfy the engineering design requirements. Preferable high temperature thermoplastic is a group of resins sold under the registered trademarks "NORYL" and "ULTEM" by the General Electric Company. "NORYL" and "ULTEM" can be used for operational temperatures up to and exceeding 180° Fahrenheit. "NORYL" resins retain tensile and flexural strength and modulus at temperatures above 200° Fahrenheit, have relatively low coefficients of thermal expansion (between 1.4 and 4.1 in/in/° $F. \times 10^{-5}$), allow for a wide choice of heat deflection temperatures while under load, have low water absorption rates at elevated temperatures which contributes to dimensional stability under high water temperature conditions and has low heat loss rates. "ULTEM" is useful in applications where a high resistance to chemical degradation from petroleum products is needed and is more stable than "NORYL" at high temperatures. Other materials such as ceramic may also be used for construction of the compartments. Various operating temperatures can be implemented by the designer or installer through the stand-by set point SSP and the operating set point OSP which may be set manually. The placement of O-rings and grooves can be varied between connecting parts. However, it is intended that the O-rings and grooves be placed for modularity and compatibility of the compartments. The compartments could also be sealed by other means such as chemically or by sonic welding.

The preferred embodiment of this invention has been shown and described above. It is to be understood that minor changes in the details, construction and arrangement of the parts may be made without departing from the spirit or scope of the invention as claimed.

What is claimed is;

1. A flow-through heating apparatus which senses temperature in a fluid conducting means through which the fluid flows, comprising:

a first heating means located within said fluid conducting means;

a first temperature sensing means associated with said first heating means for sensing the temperature of the fluid within said fluid conducting means;

a second temperature sensing means, located within said fluid conducting means downstream from said first heating means and said first temperature sensing means;

a control means including a set point temperature means for varying the temperature sensed by said first temperature sensing means when there is no fluid flow while the temperature sensed by said second temperature sensing means remains relatively constant after drifting toward an ambient temperature; and said control means further including a temperature comparison means for detecting fluid flow when the temperature sensed by said first temperature sensing means converges with the temperature sensed by said second temperature sensing means;

a second heating means located within said fluid conducting means downstream from said first temperature sensing means and associated with said second temperature sensing means;

said control means further including means for selecting an operating set point temperature to which the fluid is to be heated when there is flow through said fluid conducting means;

said control means further including means for transitioning the temperature of the fluid by targeting a transitional set point temperature between a standby set point and said operating set point;

said control mean further including means for incrementing said transitioning means which is activated when said operating set point is greater than said transitional set point and the temperature of the fluid sensed by said first temperature sensing means is not greater than the temperature of the fluid sensed by said second temperature sensing means;

said control means further including means for decrementing said transitioning means which is activated when said transitional set point is greater than said standby set point and the temperature of the fluid sensed by said first temperature sensing means is greater than he temperature of the fluid sensed by said second temperature sensing means;

said control means further including means for incrementing the demand on said first heating means activated when said transitional set point is greater than the temperature of the fluid sensed by said second temperature sensing means and the demand on said first heating means is not at a maximum demand;

said control means further including means for decrementing the demand on said first heating means activated when said transitional set point is not greater than the temperature of the fluid sensed by said second temperature sensing means and the demand on said second heating means is substantially equal to zero;

said control means further including means for incrementing the demand on said second heating means activated when said transitional set point is greater than the temperature of the fluid sensed by said second temperature sensing means, said first heating means is at the maximum demand and the demand on said second heating means is not at the maximum demand; and said control means further including means for decrementing the demand on said second heating means activated when said transitional set point is not greater than the temperature of the fluid sensed by said second temperature sensing means and the demand on said second heating means is not substantially equal to zero.

2. A flow-through heating apparatus for the instantaneous heating of fluids according to claim 1, wherein said casing of said compartment is made form a self insulting, high temperature resistant, chemical resistant thermoplastic.

3. The flow-through heating apparatus according to claim 1 wherein said fluid conducting means comprises:

at least one compartment including a casing having a hollow interior region, a fluid inlet located proximate one end and a fluid outlet located proximate the other end whereby the fluid passes from said inlet through the hollow interior region and out said outlet; and said compartment including a base having a means for isolated attaching and detaching of said base to an end of said casing, said isolated attaching and detaching means being isolated from the fluid passing through said compartment for readily and directly accessing the entire interior region after detachment of said base such that fluid and solids may be readily drained and flushed from said compartment and the interior region of said compartment may be cleaned.

4. The flow-through heating apparatus according to claim 1, further comprising:

a plurality of compartments, each of said compartments including a casing having a hollow interior region, a fluid inlet located proximate one end and a fluid outlet located proximate the other end whereby the fluid passes from said inlet through the hollow interior region and out said outlet;

said heating means including a heating element oriented in each compartment; and each of said compartments including interconnected automatic continuous venting means located at an upper end of said compartments whereby gases may be vented from said compartments and a last sequential compartment including an automatic continuous venting means located at an upper end for venting the flow-through heating apparatus during operating conditions.

5. The flow-through heating apparatus according to claim 1, further comprising:

said fluid conducting means including a first housing having a first hollow internal flow path and a second housing having a second hollow internal flow path; and sealing means for sealing between said first and second housings for fluid-tight communication between said first internal flow path and said second internal flow path.

6. A flow-through heating apparatus which senses temperature in a fluid conducting means through which the fluid flows, comprising:

a first heating means located within said fluid conducting means;

a first temperature sensing means associated with said first heating means for sensing the temperature of the fluid within said fluid conducting means;

a second temperature sensing means, located within said fluid conducting means downstream from said first heating means and said first temperature sensing means;

a second heating means located within said fluid conducting means associated said first temperature sensing means and upstream from said second temperature sensing means;

a control means including mean for selecting an operating set point temperature to which the fluid is to be heated when there is flow through said fluid conducting means;

said control means further including means for transitioning the temperature of the fluid by targeting a transitional set point temperature between a standby set point and said operating set point;

said control means further including means for incrementing said transitioning means which is activated when said operating set point is greater than said transitional set point and the temperature of the fluid sensed by said first temperature sensing means is not greater than the temperature of the fluid sensed by said second temperature sensing means;

said control means further including means for decrementing said transitioning means which is activated when said transitional set point is greater than said standby set point and the temperature of the fluid sensed by said first temperature sensing means is greater than the temperature of the fluid sensed by said second temperature sensing means;

said control means further including means for incrementing the demand on said first heating means activated when said transitional set point is greater than the temperature of the fluid sensed by said second temperature sensing means and the demand on said first heating means is not at a maximum demand;

said control means further including means for decrementing the demand on said first heating means activated when said transitional set point is not greater than the temperature of the fluid sensed by said second temperature sensing means and the demand on said second heating means is substantially equal to zero;

said control means further including means for incrementing the demand on said second heating means activated when said transitional set point is greater than the temperature of the fluid sensed by said second temperature sensing means, said first heating means is at the maximum demand and the demand on said second heating means is not at the maximum demand; and said control means further including means for decrementing the demand on said second heating means activated when said transitional set point is not greater than the temperature of the fluid sensed by said second temperature sensing means and the demand on said second heating means is not substantially equal to zero.

7. The flow-through heating apparatus according to claim 6 wherein said fluid conducting means comprises:

at least one compartment including a casing having a hollow interior region, a fluid inlet located proximate one end and a fluid outlet located proximate the other end whereby the fluid passes from said inlet through the hollow interior region and out said outlet; and said compartment including a base having a means for isolated attaching and detaching of said base to an end of said casing, said isolated attaching and detaching means being isolated from the fluid passing through said compartment for readily and directly accessing the entire interior region after detachment of said base such that fluid and solids may be readily drained and flushed from said compartment and the interior region of said compartment may be cleaned.

8. The flow-through heating apparatus according to claim 6, further comprising:

a plurality of compartments, each of said compartments including a casing having a hollow interior region, a fluid inlet located proximate one end and a fluid outlet located proximate the other end whereby the fluid passes from said inlet through the hollow interior region and out said outlet;

said heating means including a heating element oriented in each compartment; and each of said compartments including interconnected automatic continuous venting means located at an upper end of said compartments whereby gases may be vented from said compartments and a last sequential compartment including an automatic continuous venting means located at an upper end for venting the flow-through heating apparatus during operating conditions.

9. The flow-through heating apparatus according to claim 6, further comprising:

said fluid conducting means including a first housing having a first hollow internal flow path and a second housing having a second hollow internal flow path; and sealing means for sealing between said first and second housings for fluid-tight communication between said first internal flow path and said second internal flow path.

* * * * *